(12) United States Patent
Ferri

(10) Patent No.: US 7,047,499 B2
(45) Date of Patent: May 16, 2006

(54) METHOD AND SYSTEM FOR CONTROLLING A TABBED PANE IN A GRAPHICAL USER INTERFACE OF A DATA PROCESSING SYSTEM

(75) Inventor: Luca Ferri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 10/142,617

(22) Filed: May 9, 2002

(65) Prior Publication Data

US 2003/0071849 A1 Apr. 17, 2003

(30) Foreign Application Priority Data

Oct. 16, 2001 (GB) .................................. 0124791.5

(51) Int. Cl.
*G06F 3/00* (2006.01)

(52) U.S. Cl. ....................................... 715/777; 715/776

(58) Field of Classification Search ................ 715/777, 715/778, 783, 788; 345/171
See application file for complete search history.

(56) References Cited

U.S. PATENT DOCUMENTS 5,305,435 A * 4/1994 Bronson ...................... 715/777
6,160,536 A * 12/2000 Forest .......................... 715/856

OTHER PUBLICATIONS

Microsoft Windows Screen Captures, Version 4.0, Copyright 1981-1998, figures 1-4.*

* cited by examiner

*Primary Examiner*—Ba Huynh
*Assistant Examiner*—Truc T. Chuong
(74) *Attorney, Agent, or Firm*—Stephen J. Walder, Jr.; Jeffrey S. LaBaw

(57) ABSTRACT

A method and system for controlling a tabbed pane (305) in a graphical user interface of a data processing system. The tabbed pane consists of several overlying panels (230) resembling a stack of pieces of paper lying on top of one another, with only the topmost panel that is visible to a user; a selection tab (235) is attached to each panel. When the number of the tabs is high, they are organised into two or more alignments. In the tabbed pane of the invention, the alignments are arranged along different edges of the visible panel. Therefore, the tabs are distributed along the border of the visible panel, so that each time a tab is selected by the user the corresponding panel is popped up and made visible without affecting the position of the other tabs.

18 Claims, 8 Drawing Sheets

METHOD AND SYSTEM FOR CONTROLLING A TABBED PANE IN A GRAPHICAL USER INTERFACE OF A DATA PROCESSING SYSTEM

FIELD OF INVENTION

The present invention relates to a method and system for controlling a tabbed pane in a graphical user interface of a data processing system.

BACKGROUND OF THE INVENTION

Modern data processing systems, for example Personal Computers, are provided with a Graphical User Interface (GUI). This interface allows a user to control programs running on the computer by using stylised graphical elements, such as windows, dialog boxes, and pop-up or pull-down menus.

A particular kind of element supported by most graphical user interfaces is a tabbed pane. A tabbed pane consists of several overlying components (usually panels) that share a common space; the panels resemble a stack of pieces of paper lying on top of one another, with only the topmost panel that is visible to the user. A selection tab is attached to each panel. The user chooses which panel to view by selecting the tab corresponding to the desired component; the selected panel is then popped up and moved to the top of the stack.

Controlling a tabbed pane is particularly difficult when the number of panels (and corresponding tabs) is high. In current implementations, the tabs are organised into two or more groups when their number reaches a pre-set threshold value. The tabs of each group are distributed in a respective alignment; the alignments are arranged parallel to one another at the top of the tabbed pane.

A drawback of the solution known in the art is that the resulting representation of the tabbed pane is very confusing. Particularly, the high number of tabs close to one another makes it difficult to identify the tab associated with the panel to display. Moreover, each time a tab is selected, the corresponding alignment is moved in the front line (simulating a physical card file). However, this behaviour is particularly annoying for the user, since it results in the positions of the tabs to change suddenly.

It is an object of the present invention to overcome the above-mentioned drawbacks. In order to achieve this object, a method of controlling a tabbed pane in a graphical user interface of a data processing system as set out in the first claim is proposed.

DISCLOSURE OF THE INVENTION

Briefly, the present invention provides a method of controlling a tabbed pane in a graphical user interface of a data processing system, the tabbed pane including a plurality of overlaying components each one having a border with a plurality of edges and a plurality of selection tabs each one associated with a corresponding component, wherein the method includes the steps of: displaying the tabbed pane with the tabs distributed in at least two alignments when the number of tabs reaches a threshold value, making visible the component corresponding to a selected tab, and arranging the at least two alignments along a plurality of different edges of the visible component.

Moreover, the present invention also provides a computer program for performing the method, a product storing the program, and a corresponding data processing system.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
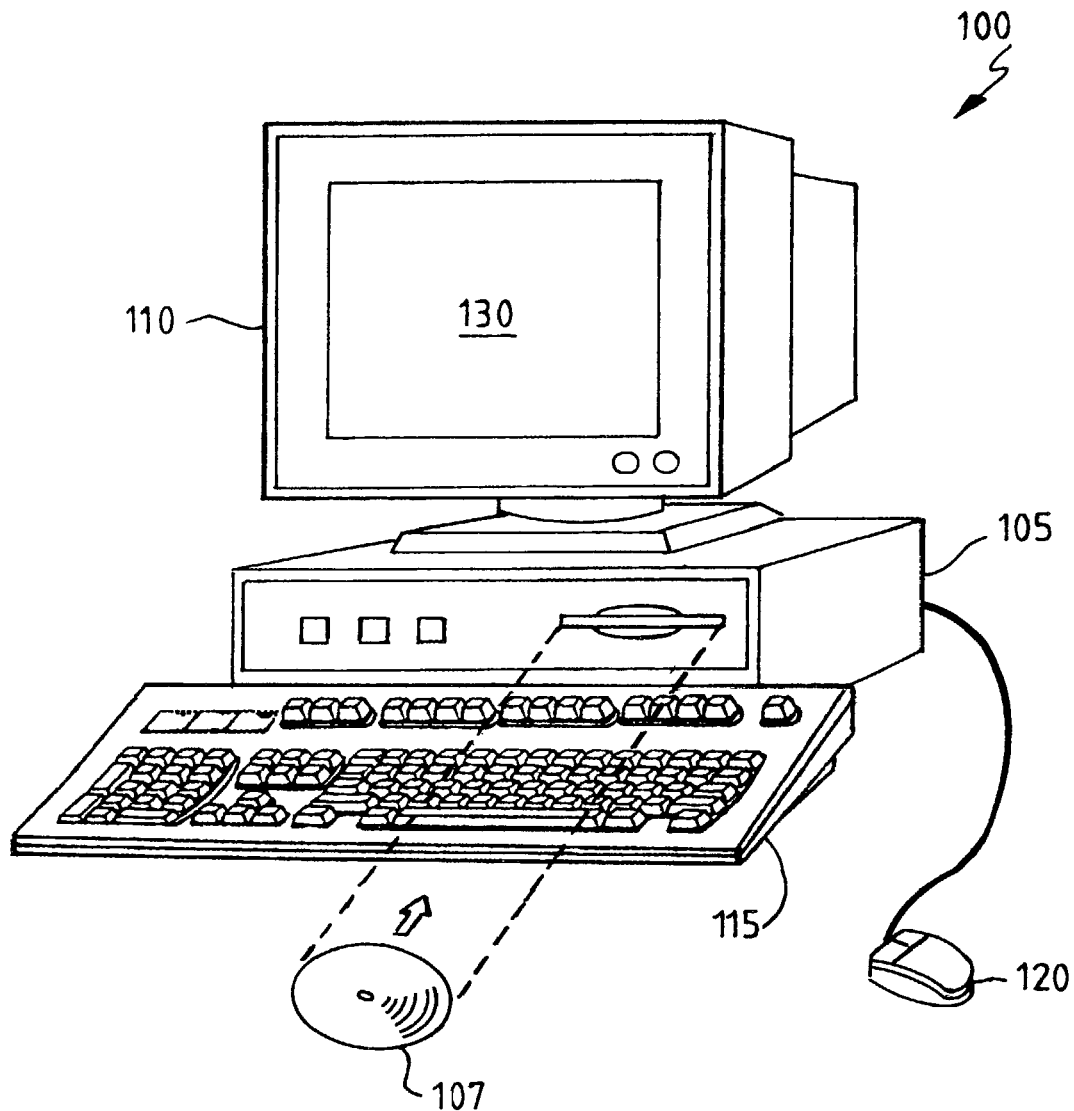
FIG. 1 is a pictorial representation of a computer in which the method of the invention can be used.

With reference in particular to FIG. 1, there is shown a Personal Computer 100. The computer 100 consists of a central unit 105, which houses the electronic circuits controlling its operation (such as a microprocessor and a working memory), in addition to a hard-disk and a driver for CD-ROMs 107. A monitor 110 and a keyboard 115 are connected to the central unit 105 in a conventional manner. The computer 100 further includes a mouse 120 (with a left and a right button), which is used to manipulate the position of a pointer (not shown in the figure) on a screen 130 of the monitor 110.

Similar considerations apply if the computer has a different structure, if it is replaced by an equivalent data processing system (such as a mini-computer), if it includes different units (for example a printer), if the monitor and the mouse are replaced by an equivalent display unit and pointing device, respectively, and so on.

Figure 2A:
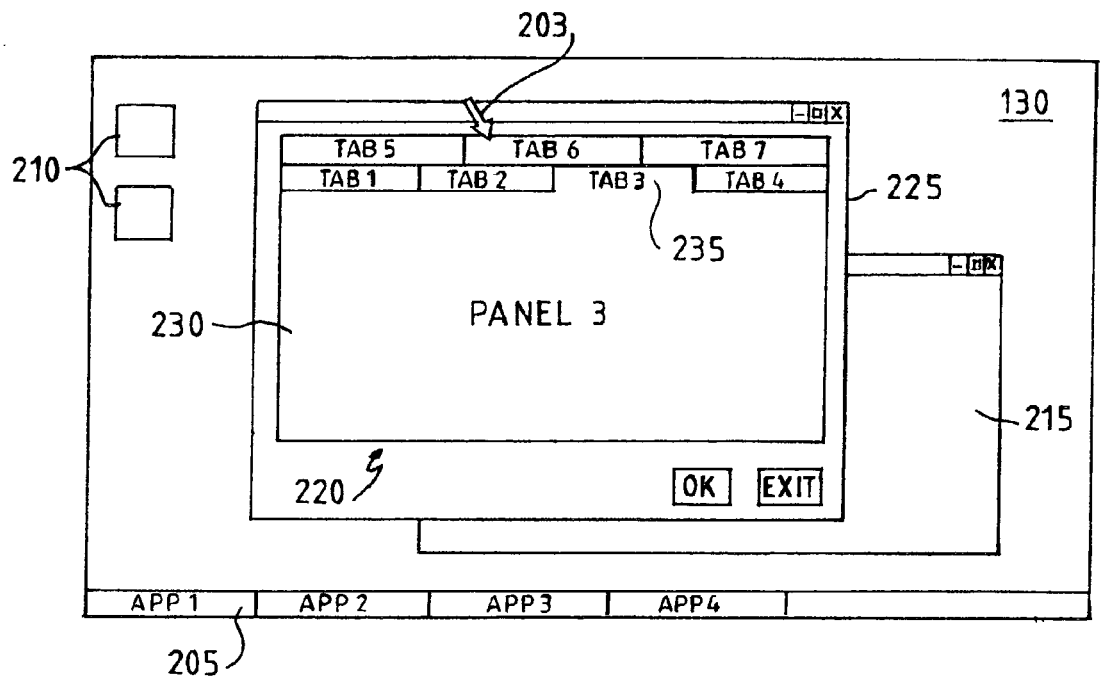
FIGS. 2a–2b show a graphical user interface of the computer with a tabbed pane known in the art.

As shown in FIG. 2a, the computer is provided with a graphical user interface. Particularly, the screen 130 is arranged to resemble a single desktop; execution of application programs involves different types of graphical elements to be displayed on the desktop. A user interacts with the programs by generating a sequence of mouse and keyboard commands; a current position on the desktop, to which the mouse points, is denoted with an arrow 203.

In the example at issue, the desktop includes an application bar 205, two icons 210 and a window 215. A tabbed pane 220 is displayed inside a further window 225 (with its title bar, an OK button and an EXIT button). The tabbed pane 220 consists of multiple panels 230 that are used to present information to the user; each panel 230 is rectangular-shaped, with a top edge, a right edge, a bottom edge, and a left edge. The panels 230 overlay so as to resemble a stack of pieces of paper lying on top of one another; only the topmost panel is visible to the user.

Figure 2B:
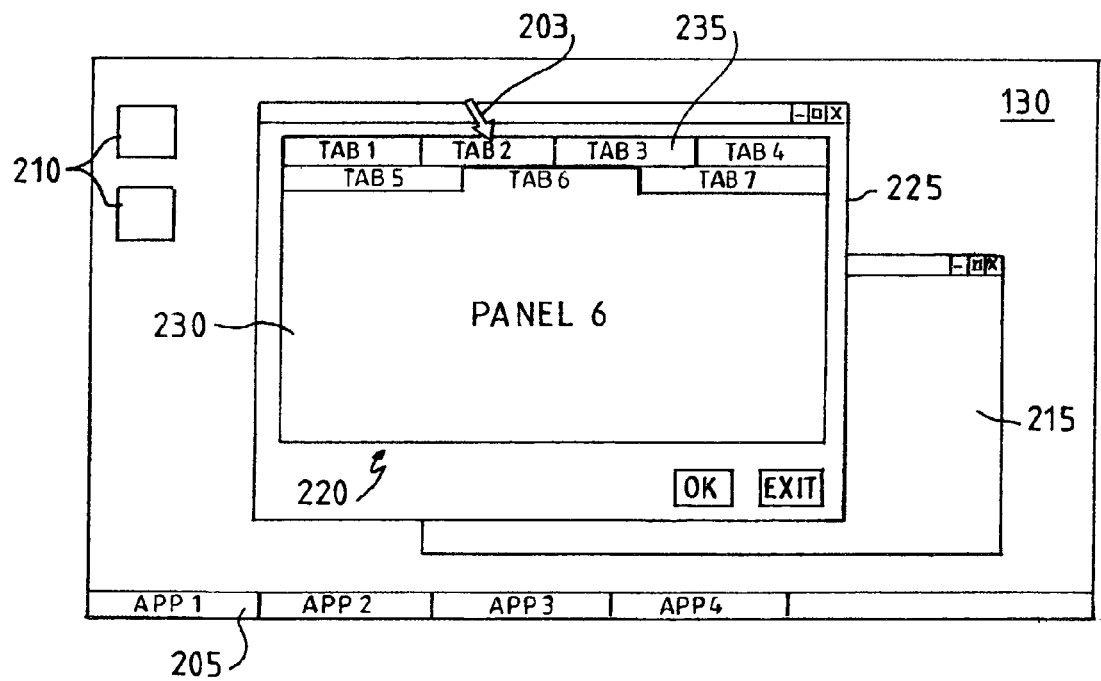

Each panel is provided with a selection tab 235. The tabs 235 are distributed in two alignments when their number reaches a threshold value (for example 5); as shown in the figure, in the tabbed pane known in the art the alignments are arranged parallel to one another along the top edge of the visible panel 230. A panel 230 may be popped up and moved to the top of the stack by positioning the arrow (or pointer) 203 in the corresponding tab 235 and clicking the left button of the mouse. For example, if the user selects the tab 235 denoted with TAB6, the whole alignment including this tab is moved in the front line, and the corresponding panel 230 denoted with PANEL6 is made visible (see FIG. 2b).

Figure 3A:
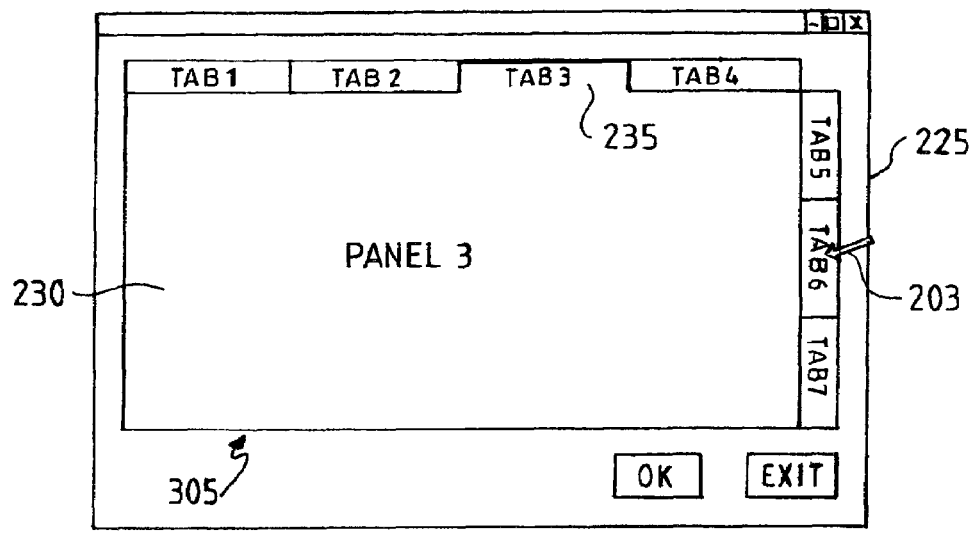
FIGS. 3a–3h depict different embodiments of the tabbed pane according to the present invention.
Figure 3B:
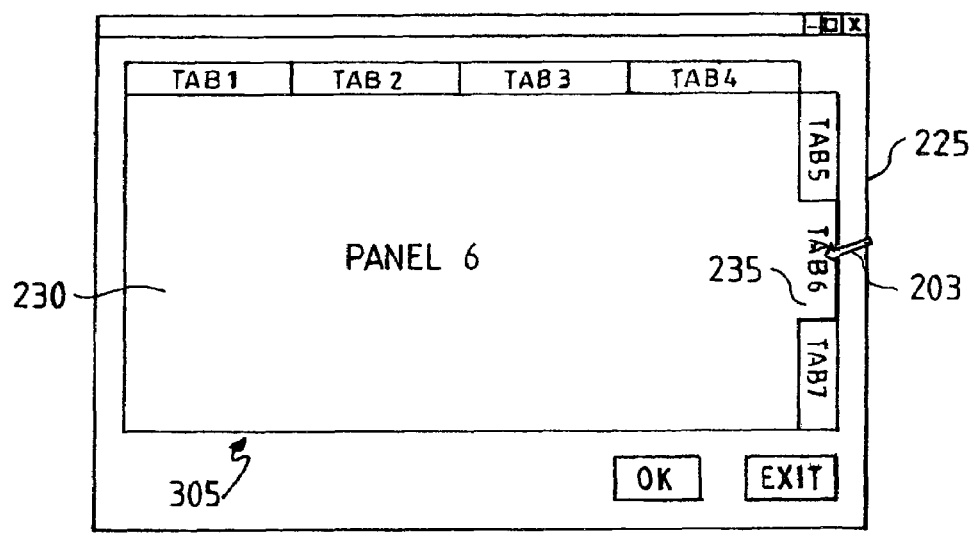

With reference now to FIG. 3a (the elements corresponding to the ones shown in the FIG. 2a are denoted with the same references, and their explanation is omitted for the sake of simplicity), there is shown a tabbed pane 305 according to a preferred embodiment of the present invention. In this case, contrary to the prior art, each alignment is arranged along a different edge of the visible panel 230; preferably, the alignments appear along adjacent edges according to a pre-set direction of rotation. In the example shown in the figure, the tabs 235 are distributed clockwise along the top edge and the right edge of the visible panel 230. Therefore, when the user selects a tab 235, such as the one denoted with TAB6, the corresponding panel 230 denoted with PANEL6 is made visible without affecting the position of the other tabs 235 (see FIG. 3b).

Figure 3C:
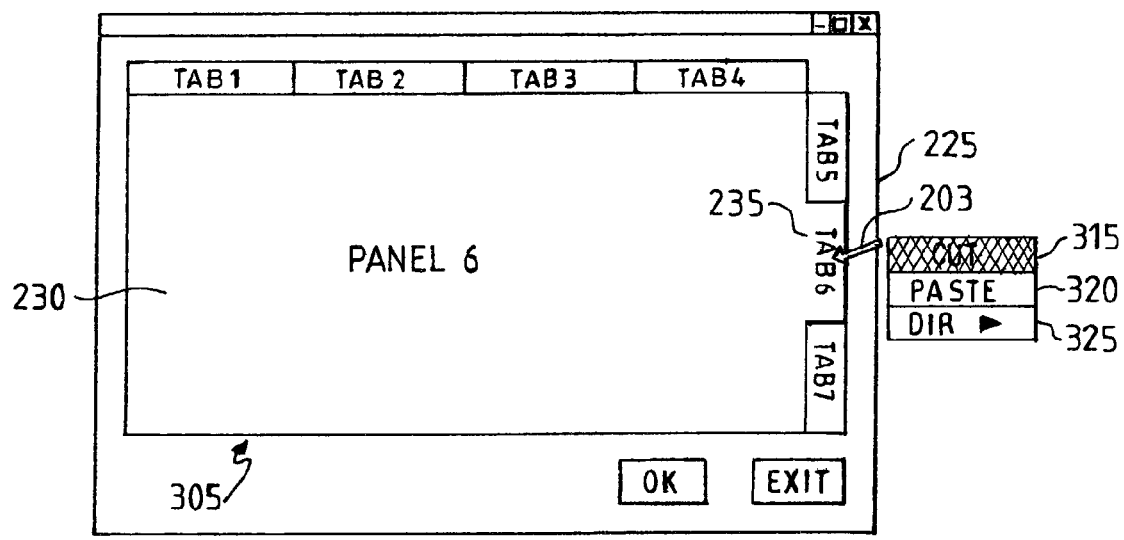
Figure 3D:
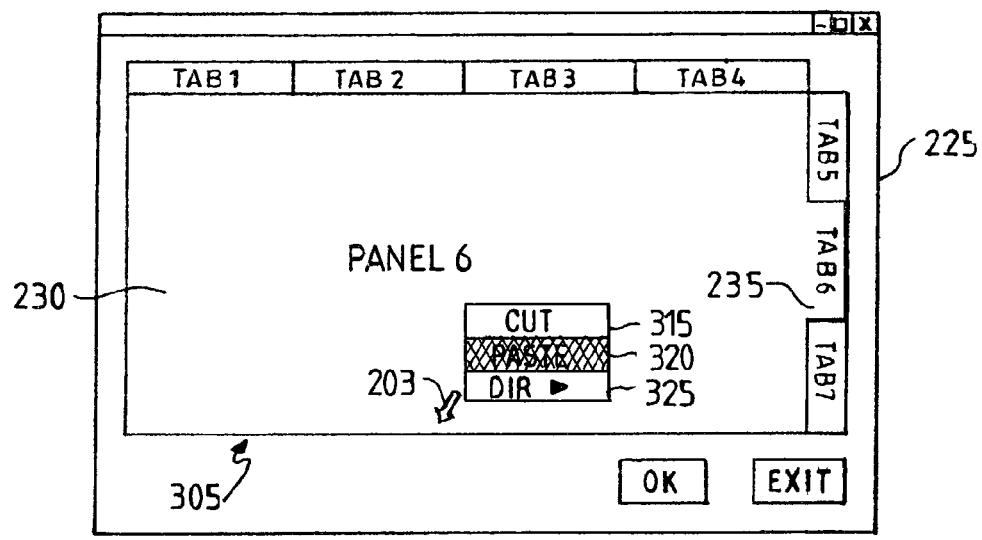

Considering FIG. 3c, the user may change the position of the tabs 235 with a simple cut and past operation. Particularly, the user points at one of the tabs 235 and clicks the right button of the mouse. A pop-up menu appears on the desktop, close to the pointer 203; the menu includes a cut command 315, a paste command 320, and a direction option 325. Upon selection of the cut command 315, all the tabs 235 are greyed. The user moves the pointer 203 to a different position (FIG. 3d); he or she then clicks the right button of the mouse and selects the paste command 320 (this command is disabled, as shown in FIG. 3c, if not cutting has been previously performed). As a consequence, the tabs 235 are moved and arranged starting from the beginning of the edge of the visible panel 230 (according to the pre-set direction of rotation), which is closest to the position of the pointer 203. In the example shown in FIG. 3e, the tabs 235 are distributed clockwise along the bottom edge and the left edge of the visible panel 230.

Figure 3E:
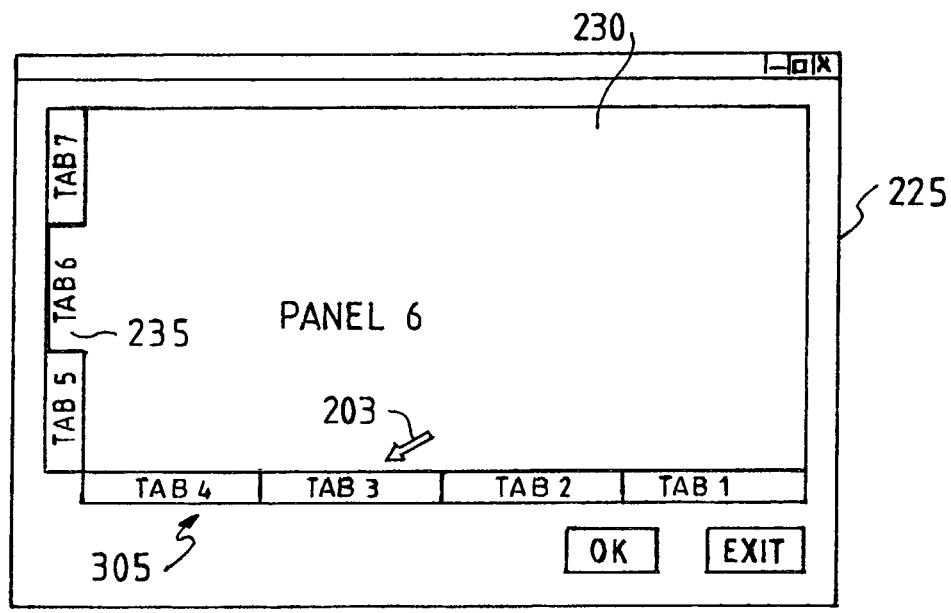
Figure 3F:
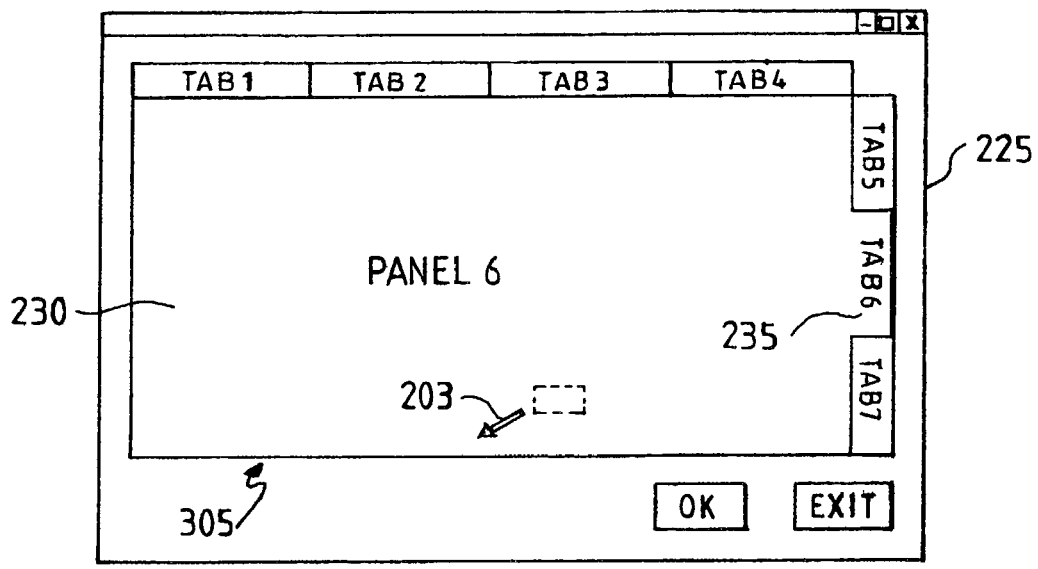

The same result may be obtained with a drag and drop operation. To move the tabs 235 to the desired position (from the configuration shown in FIG. 3b), the user selects (or grabs) the tabs 235 with the left button of the mouse. A dashed square corresponding to the tabs is then moved to the desired position while keeping the left button of the mouse pressed down (see FIG. 3f). Upon release of the left button of the mouse, the tabs 235 are likewise moved and arranged starting from the beginning of the edge of the visible panel 230 that is closest to the position of the pointer 203 (as shown in FIG. 3e).

Figure 3G:
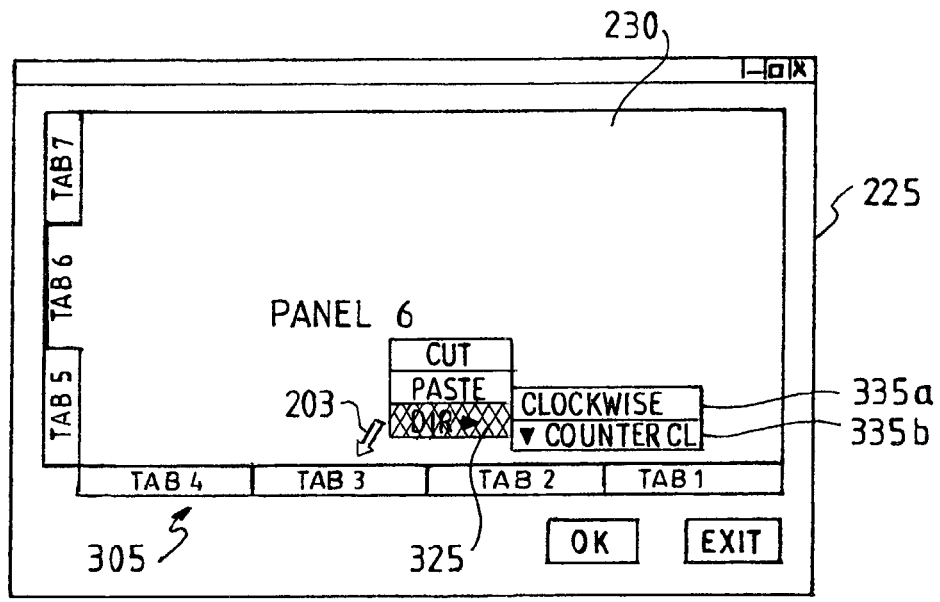
Figure 3H:
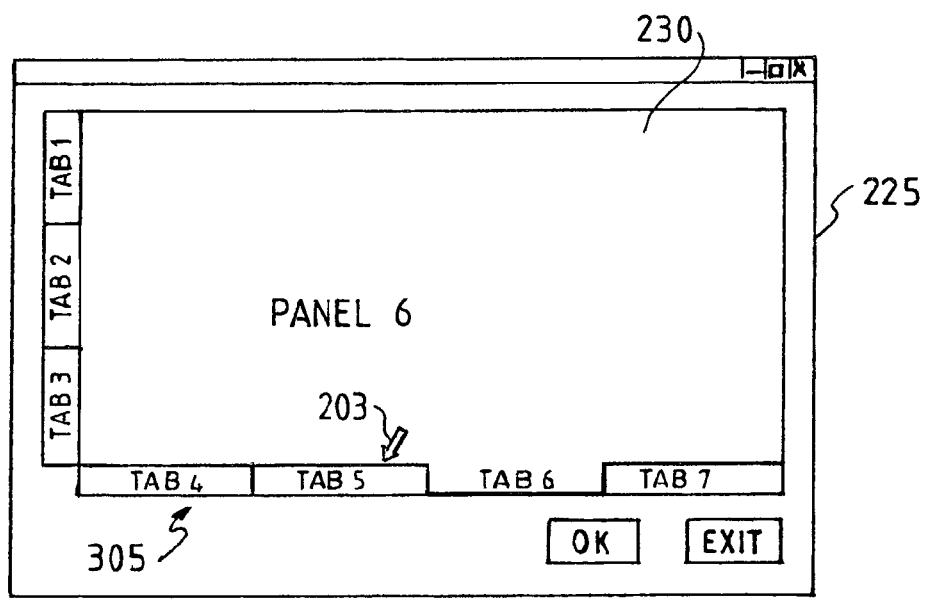

An additional feature of the tabbed pane 305 described above is that of allowing the user to select the direction of rotation of the tabs 235. Considering FIG. 3g, the user points at one of the tabs 235 and clicks the right button of the mouse in order to display the respective pop-up menu; he or she then selects the direction option 325. As a consequence, a corresponding cascading menu appears on the desktop, close to the direction option 325; the cascading menu includes a clockwise option 330a and a counter clockwise option 330b. If the user selects the counter clockwise option 330b, the tabs 235 are re-arranged in this direction of rotation starting from the beginning of the edge of the visible panel 230 that includes the last tab 235 (TAB7); in the example shown in FIG. 3h, the tabs 235 are distributed counter clockwise along the left edge and the bottom edge of the visible panel 230.

Similar considerations apply if the tabbed pane has a different structure, if the panels are replaced by equivalent components, if the panels have a different shape, if the tabs are arranged in three or more alignments, if the threshold value (for arranging the tabs in two or mode alignments) is defined in a different manner, if a pull-down menu is provided instead of or in addition to the pop-up menu, and the like.

Figure 4:
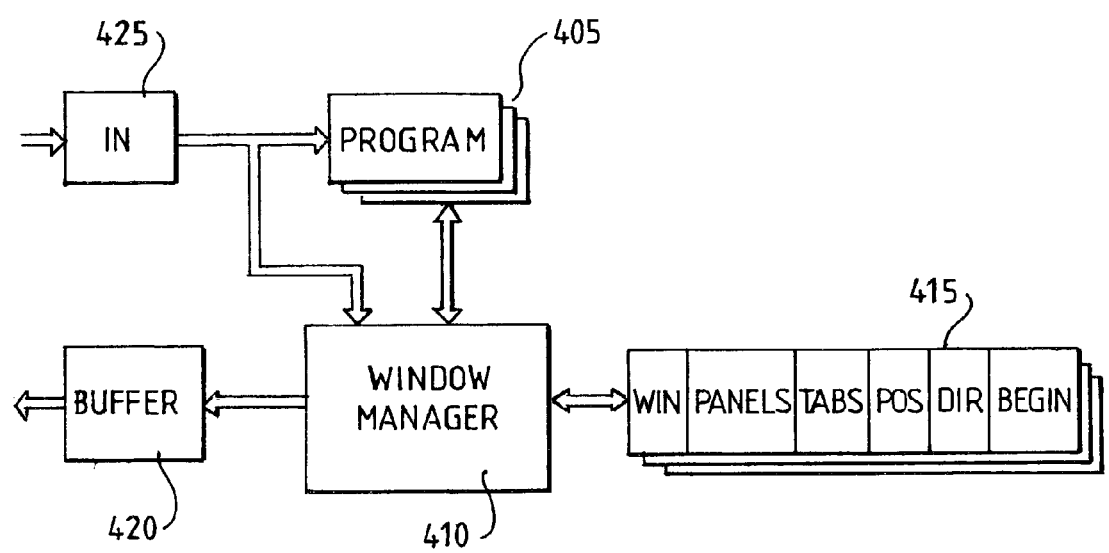
FIG. 4 shows a partial content of a working memory of the computer.

Considering now FIG. 4, application programs 405 running on the computer interact with the graphical user interface, which is generally part of an operating system including a collection of utility programs for controlling operation of the computer. The application programs 405 make use of operating system functions by issuing task commands to the operating system that then performs the requested task.

Particularly, the operating system includes a window manager 410, which is responsible for managing the graphical elements that a user views during operation of the application programs 405. The window manager 410 accesses a repository 415. The repository 415 includes a record for each tabbed pane; the record consists of a field WIN that defines the respective window (such as its position and size), a field PANELS that defines the panels of the tabbed pane (such as their content), and a field TABS that defines the corresponding tabs (such as their name). A field POS identifies the starting position of the tabs (edge and off-set along the edge), a field DIR defines their direction of rotation (clockwise or counter clockwise), and a flag BEGIN indicates that the starting position is always set at the beginning of the respective edge when asserted.

In order to display information on the desktop, application programs 405 generate and send display requests to the window manager 410; the window manager 410 in turn interfaces directly with a screen buffer 420 (which content is then provided to the monitor). An input interface 425 is used to enter data and/or commands with the keyboard or the mouse, either for the application programs 405 or for the window manager 410.

Similar considerations apply if the graphical user interface includes different modules, if the repository is replaced by an equivalent data structure, if the repository stores additional information, and so on.

Figure 5:
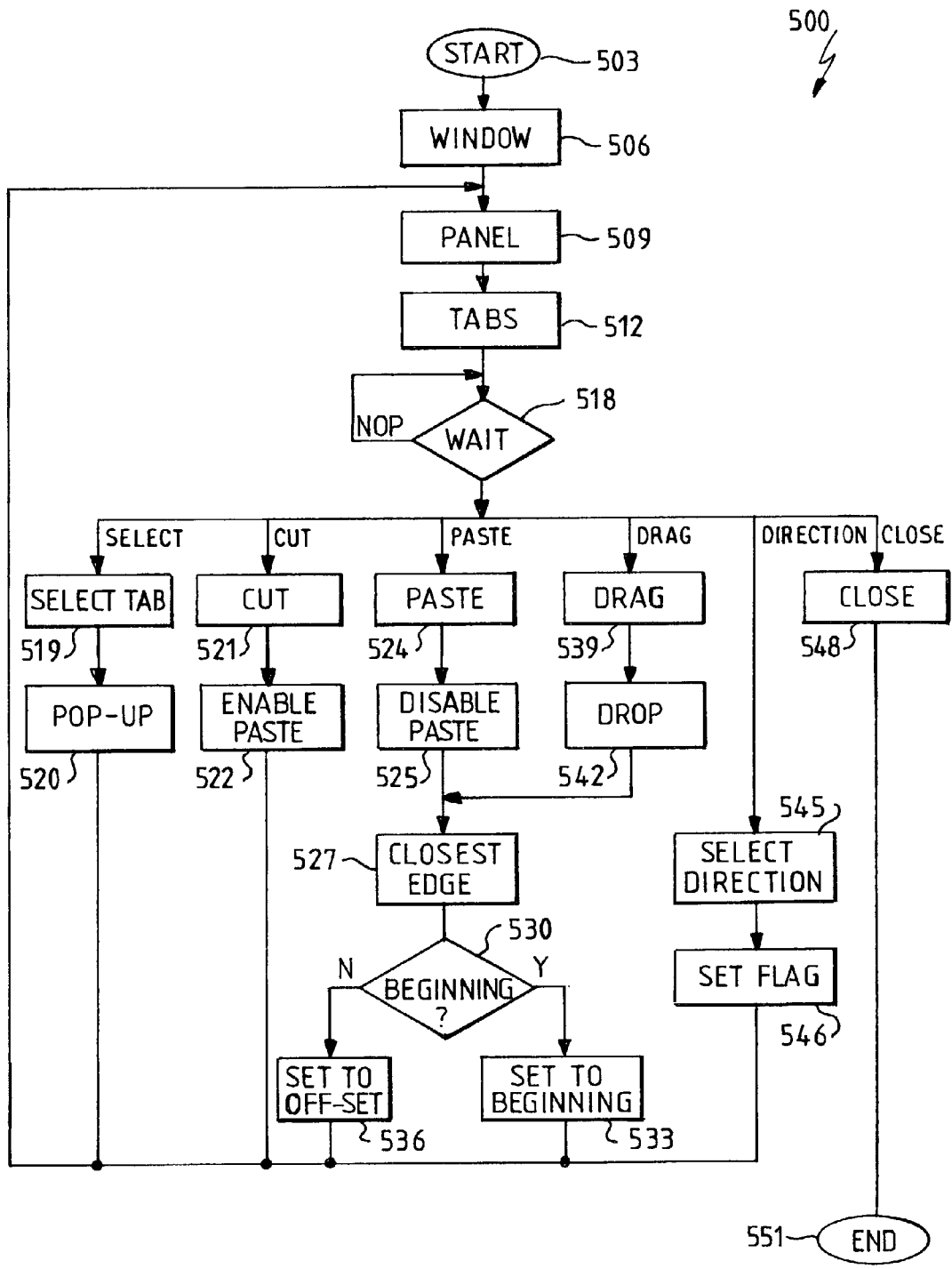
FIG. 5 is a flow chart describing the logic of a method used for controlling the tabbed pane.

With reference now to FIG. 5, when the tabbed pane is displayed on the desktop the window manager performs a method 500 (it should be noted that the method is described with a flow chart for the sake of simplicity, although the window manager typically operates according to the object-oriented paradigm). The method starts at block 503 and then passes to block 506, wherein the window including the tabbed pane is displayed on the desktop. Passing to block 509, the window manager displays a currently visible panel inside the window. The method proceeds to block 512, wherein the window manager arranges the tabs along the border of the visible panel. Particularly, the tabs are organised into one or more groups of a pre-set number of elements; the tabs of each group are aligned along a corresponding edge of the visible panel, from the starting position and according to the direction of rotation stored in the record of the repository describing the tabbed pane.

The method then enters an idle loop at block 518, waiting for an action by the user. The method carries out different operations responsive to the action performed by the user. Particularly, if the user has selected the function of displaying a different panel, the corresponding tab is selected at block 519; proceeding to block 520, the panel associated with the selected tab is popped up and moved to the top of the stack. The method then returns to block 509 for refreshing the tabbed pane on the desktop (with the result of making visible the selected panel).

If the user has selected the function of cutting the tabs (block 518), a corresponding flag is asserted at block 521; the past option of the pop-up menu is then enabled at block 522. The method returns to block 509 for refreshing the tabbed pane on the desktop (with the result of having the tabs greyed).

If the user has selected the function of pasting the tabs (block 518), the current position of the pointer on the desktop is detected at block 524, and the pasting command is disabled in the pop-up menu at block 525. The method continues to block 527, wherein the distance of the current position of the pointer from each edge of the visible panel is calculated; the edge that is closest to the current position of the pointer is selected. The window manager verifies at block 539 whether the flag BEGIN (in the record of the repository describing the tabbed pane) is asserted. If so, the method descends into block 533, wherein the starting position is set to the beginning of the selected edge (according to the current direction of rotation); conversely, the starting position is set to the orthogonal projection of the current position of the pointer on the selected edge at block 536. In both cases, the method returns to block 509 for refreshing the tabbed pane on the desktop (with the result of having the tabs re-arranged from the new starting position).

If the user has selected the function of dragging and dropping the tabs (block 518), the method passes to block 539, wherein the dashed square corresponding to the tabs is moved across the desktop with the mouse. As soon as the left button of the mouse is released, the current position of the dashed square on the desktop is detected at block 542. The method then continues to block 527 for performing the same operations described above.

If the user has selected the function of changing the direction of rotation (block 518), the desired direction of rotation (clockwise or counter clockwise) is selected at block 545; proceeding to block 546, the field DIR (in the record of the repository describing the tabbed pane) is set to the selected direction of rotation. The method then returns to block 509 for refreshing the tabbed pane on the desktop (with the result of having the tabs re-arranged according to the selected direction of rotation).

At the end, if the user has selected the exit option, the window including the tabbed pane is closed at block 548; the method then ends at the final block 551.

Similar considerations apply if the program performs an equivalent method, if additional features are provided, for example for changing the relative position of the tabs or for changing the number of tabs in each alignment, for re-sizing the panels and/or the tabs, for moving the tabbed pane across the window, and the like.

More generally, the present invention provides a method of controlling a tabbed pane in a graphical user interface of a data processing system. The tabbed pane includes a plurality of overlaying components, each one having a border with a plurality of edges; the tabbed pane further includes a plurality of selection tabs each one associated with a corresponding component. The tabbed pane is displayed, with the tabs distributed in two or more alignments when the number of the tabs reaches a threshold value; the component corresponding to a selected tab is then made visible. In the method according to the invention, the alignments are arranged along a plurality of different edges of the visible component.

The devised solution makes it easier to control the tabbed pane, particularly when the number of tabs is high (even if its use with any number of tabs is contemplated and within the scope of the invention).

The arrangement of the tabs proposed by the present invention results is a very simple representation of the tabbed pane. Particularly, the user may readily identify the tab associated with the panel that he or she wishes to view. Moreover, each time a tab is selected, the corresponding panel is popped up and made visible without affecting the position of the other tabs.

The preferred embodiment of the invention described above offers further advantages. For example, the tabs are arranged along adjacent edges of the visible panel. This makes the representation of the tabbed pane particularly effective. However, the solution of the invention leads itself to be implemented even with the tabs that are arranged in a different manner, such as along the top edge and the bottom edge of the visible panel.

Advantageously, the user may move the tabs to a desired position along the border of the visible panel. Moreover, the user may also select a desired direction of rotation (clockwise or counter clockwise) of the tabs. Preferably, the tabs are always arranged starting from the beginning of a selected edge of the visible panel.

These additional features allow the user to change the appearance of the tabbed pane according to his or her needs. Particularly, the arrangement of the tabs from the beginning of the selected edge of the visible panel improves the appearance of the tabbed pane.

Alternatively, the tabs may be placed along the border of the visible panel starting from any position, the user cannot change the direction of rotation, or the tabs are distributed along the border of the visible panel always starting from a fixed position.

In a preferred embodiment of the present invention, the tabs are moved with a cut and paste operation. The same result may also be obtained with a drag and drop operation.

As a consequence, controlling the configuration of the tabbed pane is really user friendly.

However, the solution of the present invention leads itself to be implemented even selecting the starting position of the tabs in a different manner, for example using short-cut commands of the keyboard and moving the pointer with arrow keys.

Advantageously, the method of the invention is carried out by a computer program (software), which is provided on CD-ROM.

Alternatively, the program is provided on floppy-disk, is pre-loaded onto the hard-disk, or is stored on any other computer readable medium, is sent to the computer through a network (typically the INTERNET), is broadcast, or more generally is provided in any other form directly loadable into a working memory of the computer. However, the method according to the present invention leads itself to be carried out even with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

What is claimed is:

1. A method of controlling a tabbed pane in a graphical user interface of a data processing system, the tabbed pane including a plurality of overlaying components each one having a border with a plurality of edges and a plurality of selection tabs each one associated with a corresponding component, wherein the method includes the steps of:

displaying the tabbed pane, making visible the component corresponding to a selected tab, distributing the tabs in at least two alignments when the number of tabs reaches a threshold value, selecting a starting position for the tabs, and
automatically arranging the at least two alignments along a plurality of different edges of the border of the visible component from the starting position according to a pre-set direction of rotation.

2. The method according to claim 1, wherein the at least two alignments are arranged along adjacent edges of the visible component.

3. The method according to claim 1, further including the step of receiving a selection of the direction of rotation from a user via a user interface.

4. The method according to claim 1, further including the steps of:
selecting one of the edges of the visible component, and
arranging the tabs starting from a beginning of the selected edge according to the pre-set direction of rotation.

5. The method according to claim 4, further including the steps of:
cutting the tabs,
pasting the tabs in a selected position, and
arranging the tabs starting from the beginning of the edge of the visible component closest to the selected position.

6. The method according to claim 4, further including the steps of:
dragging the tabs,
dropping the tabs in a selected position, and
arranging the tabs starting from the beginning of the edge of the visible component closest to the selected position.

7. The method of claim 1, wherein arranging the at least two alignments along a plurality of different edges of the border of the visible component from the starting position according to a pre-set direction of rotation comprises:
placing a first alignment of tabs along a first edge of the visible component; and
placing a second alignment of tabs along a second edge of the visible component, wherein the first edge and second edge are adjacent to each other, and wherein the method further comprises:
receiving a user command to reconfigure a position of the first alignment of tabs;
reconfiguring a first position of the first alignment of tabs to be along a different edge from the first edge of the visible component in response to receiving the user command; and
reconfiguring a second position of the second alignment of tabs to be along a different edge from the second edge of the visible component in response to receiving the user command.

8. The method of claim 7, wherein the different edge from the first edge of the visible component along which the first alignment of tabs is placed and the different edge from the second edge of the visible component along which the second alignment of tabs is placed are adjacent to each other.

9. The method of claim 7, wherein a relative placement of the first alignment of tabs to the second alignment of tabs is maintained after reconfiguring the first position of the first alignment of tabs and reconfiguring the second position of the second alignment of tabs.

10. The method of claim 7, wherein the different edge from the first edge of the visible component, along which the first position of the first alignment of tabs is reconfigured, is the second edge of the visible component, and wherein the different edge from the second edge of the visible component, along which the second position of the second alignment of tabs is reconfigured, is a third edge of the visible component.

11. The method of claim 1, wherein the pre-set direction of rotation is either clockwise or counter-clockwise.

12. The method of claim 1, wherein the pre-set direction of rotation is defined in a data structure defining characteristics of the tabbed pane, and wherein arranging the tabs along the border of the visible component comprises accessing the data structure to determine the pre-set direction of rotation.

13. The method of claim 12, wherein the data structure further comprises a field identifying a content of panels of the tabbed pane, a field identifying tabs of the tabbed pane, a field identifying a starting position for the tabs of the tabbed pane, and a field identifying whether or not the starting position is at a beginning of an edge of the tabbed pane.

14. A computer program product, in a computer readable medium, which is directly loadable into a working memory of a data processing system for performing a method of controlling a tabbed pane in a graphical user interface of the data processing system when the program is run on the data processing system, the tabbed pane including a plurality of overlaying components each one having a border with a plurality of edges and a plurality of selection tabs each one associated with a corresponding component, wherein the method includes the steps of:
displaying the tabbed pane,
making visible the component corresponding to a selected tab,
distributing the tabs in at least two alignments when the number of tabs reaches a threshold value,
selecting a starting position for the tabs, and
automatically arranging the at least two alignments along a plurality of different edges of the border of the visible component from the starting position according to a pre-set direction of rotation.

15. The computer program of claim 14, wherein arranging the at least two alignments along a plurality of different edges of the border of the visible component from the starting position according to a pre-set direction of rotation comprises:
placing a first alignment of tabs along a first edge of the visible component; and
placing a second alignment of tabs along a second edge of the visible component, wherein the first edge and second edge are adjacent to each other, and wherein the method further comprises:
receiving a user command to reconfigure a position of the first alignment of tabs;
reconfiguring a first position of the first alignment of tabs to be along a different edge from the first edge of the visible component in response to receiving the user command; and
reconfiguring a second position of the second alignment of tabs to be along a different edge from the second edge of the visible component in response to receiving the user command.

16. A data processing system with a graphical user interface having:
means for displaying a tabbed pane including a plurality of overlaying components each one having a border with a plurality of edges and a plurality of selection tabs each one associated with a corresponding component, means for making visible the component corresponding to a selected tab, means for distributing the tabs in at least two alignments when the number of tabs reaches a threshold value, means for arranging the at least two alignments along a plurality of different edges of the visible component, means for selecting a starting position for the tabs, and means for automatically arranging the tabs along the border of the visible component from the starting position according to a pre-set direction of rotation.

17. A data processing system with a graphical user interface having:

a processor; and a memory coupled to the processor, wherein the memory stores instructions which, when executed by the processor, provide a window manager for displaying a tabbed pane including a plurality of overlaying components each one having a border with a plurality of edges and a plurality of selection tabs each one associated with a corresponding component, wherein the window manager:

makes visible the component corresponding to a selected tab, distributes the tabs in at least two alignments when the number of tabs reaches a threshold value, selects a starting position for the tags, and arranges the at least two alignments along a plurality of different edges of the border of the visible component from the starting position according to a pre-set direction of rotation.

18. The data processing system of claim 17, wherein the processor arranges the at least two alignments along a plurality of different edges of the border of the visible component from the starting position according to a pre-set direction of rotation by:

placing a first alignment of tabs along a first edge of the visible component; and placing a second alignment of tabs along a second edge of the visible component, wherein the first edge and second edge are adjacent to each other, and wherein the processor further:

receives a user command to reconfigure a position of the first alignment of tabs;

reconfigures a first position of the first alignment of tabs to be along a different edge from the first edge of the visible component in response to receiving the user command; and reconfigures a second position of the second alignment of tabs to be along a different edge from the second edge of the visible component in response to receiving the user command.

* * * * *